INVENTOR
JEAN SAHORES
BY Bacon & Thomas
ATTORNEYS

Aug. 10, 1965    J. SAHORES    3,200,247
APPARATUS FOR THE X-RAY ABSORPTION ANALYSIS OF SULPHUR GAS
Filed Sept. 30, 1963    2 Sheets-Sheet 2

INVENTOR
JEAN SAHORES
BY
Bacon & Thomas
ATTORNEYS 3,200,247
APPARATUS FOR THE X-RAY ABSORPTION
ANALYSIS OF SULPHUR GAS
Jean Sahores, Pau, France, assignor to Societe Nationale
des Petroles d'Aquitaine, Paris, France, a French
company
Filed Sept. 30, 1963, Ser. No. 312,486
Claims priority, application France, Oct. 5, 1962,
911,366
3 Claims. (Cl. 250—43.5)

The present invention relates to an X-ray sulphurimeter for the determination of the sulphur content of crude gas under high pressure.

Processes are known for the determination of an element contained in a fluid by the measurement of the absorption by this fluid of radiation passing through it.

However, when it is required to effect a continuous determination of the sulphur content in the effluent from a natural gas field at the outlet of a well, the effluent having high density of flow and being at high pressure, the known arrangements possess numerous drawbacks, especially as regards their robustness, their gas-tightness, the high intensity of radiation necessary and the elimination of the influence of the liquid phase at the measuring point.

The X-ray sulphurimeter forming the subject of the present invention enables these disadvantages to be overcome. It can be used for gas flows of the order of two million cubic metres per day at a pressure which can reach 1,000 kg./sq. cm. and a temperature of the order of 150° C.

The present invention provides an X-ray sulphurimeter characterised by the combination of a collar mounted on a well exploitation line, through which collar there is located in gas-tight fashion two tubular members each having an axial bore extending therethrough and disposed on a common axis perpendicular to the axis of the collar on either side thereof, each of these tubular members having the end adjacent the gas outlet aperture of the collar sealed with a pellet of beryllium and having at the other end thereof, a trued lateral bearing surface, the collar being provided with a U-shaped frame, one limb of which supports an X-ray tube and the other limb having mounted thereon a collimation assembly, a monochromatic crystal and a radiation counter, the said frame having two machined bearing surfaces arranged to co-operate respectively with the two trued bearing surfaces of the tubular members such that when the collar and frame are arranged in assembled relationship, the X-ray source, the two tubular members and the collimation assembly are disposed on a common axis.

According to a further feature of the invention, the tubular members extend beyond the internal wall of the collar.

According to a still further feature of the invention the nuts for clamping the beryllium pellets in place within the tubular members possess circular grooves on their external faces.

According to a further feature of the invention the beryllium pellets are disposed within the tubular members such that their external surfaces are flush with the ends of the tubular members.

The X-ray sulphurimeter according to the invention will now be described by way of example only, with particular reference to the accompanying drawings wherein.

A collar 1 of hollow cylindrical form intended to be fixed between two normal flanges of a well exploitation line and comprising for this purpose holes 1a for the passage of the securing bolts, carries two tubular members 2 each having an axial bore extending therethrough and each fixed in gas-tight fashion and disposed on a common axis perpendicular to the axis of the collar 1 and on either side thereof.

Figure 2:
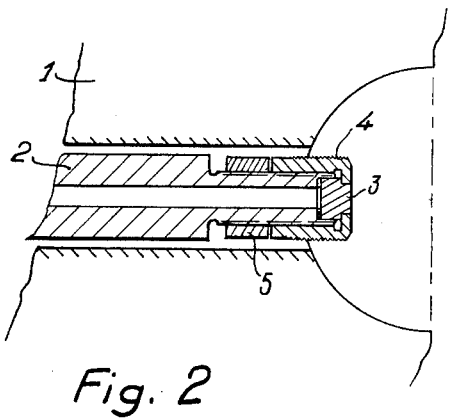
FIGURE 2 is a view on an enlarged scale of a part of the collar and a tubular member of FIG. 1.

Each of the tubular members 2 is sealed, at the end adjacent the gas outlet bore of collar 1, by a beryllium pellet 3, held in place by means of a nut 4 and a lock nut 5, which may be seen more clearly in FIGURE 2.

Figure 3:
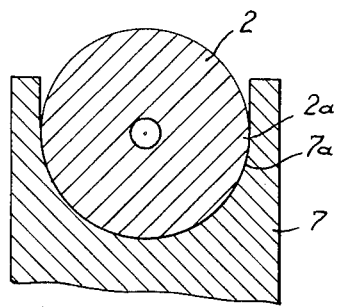
FIGURE 3 is a sectional view on an enlarged scale taken along the line III—III of FIGURE 1.

The outer end of each tubular member 2 is formed with a trued positioning bearing surface 2a (see also FIG. 3).

A rod 6 has one end thereof secured to the collar 1 and the other end thereof is threaded.

A U-shaped frame 7 has the limbs thereof formed with two machined bearing surfaces 7a (FIG. 3) intended to co-opearte with the bearing surfaces 2a of the tubular members 2. The frame 7 has the portion connecting the two limbs thereof formed with a bore 7b through which the rod 6 passes; a nut 7c is screwed on the threaded end of the rod 6 and enables the frame 7 to be detachably secured to the collar 1.

Figure 1:
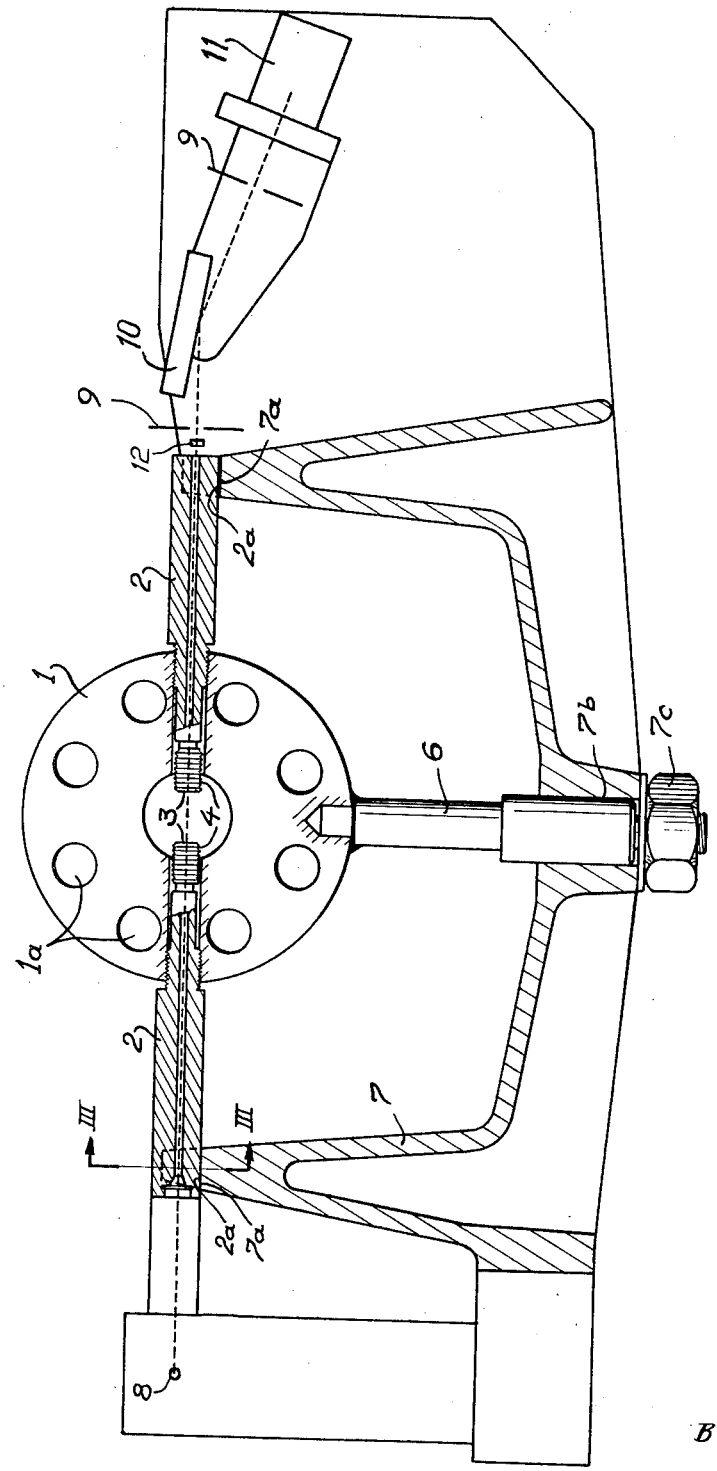
FIGURE 1 is a diagrammatic plan view, partially in section, of the sulphurimeter.

The frame 7 carries on one of its two limbs an X-ray tube 8 supplied in known manner by a stabilised generator (not shown). On the other limb thereof the frame 7 carries a collimation assembly represented diagrammatically in FIGURE 1 by the reference 9, a monochromator crystal 10 and a counter 11 which may be of the Geiger-Müller type.

The counter 11 is followed by an assembly of known type (not shown) for discrimination, amplification, counting and recording purposes.

The operation of the sulphurimeter is a follows:

A calibration of the apparatus is effected by installing the detachable frame 7 on an accompanying test collar identical with the collar 1.

The curve of absorption of the selected radiation is established for a series of calibrated sulphur pellets which are placed in the test collar between the two beryllium pellets 3.

The frame 7 is then mounted on the collar 1; the tightening of the nut 7c brings the bearing surfaces 2a and 7a into contact and thus effects perfect alignment of the X-ray source of the tube 8, the tubular members 2 and the collimation assembly 9.

The gas from the exploitation line passing through the central aperture of collar 1 produces a variation of the X-ray intensity transmitted from the tube 8 to the counter 11.

By referring the measured values of this intensity to the pre-established calibration curve, the crude equivalence of the gas in terms of a solid sulphur density is obtained.

This information is corrected to take account of the presence of certain other elements contained in the gas and then the real sulphur content of the gas is obtained, which can be expressed in grammes of sulphur per cubic centimeter of gas. It is sufficient to know further the specific mass of the gas in order to express its sulphur content in percentage by weight.

For the measurement there is advantageously used a strictly monochromatic beam of X-rays, the selection of the wave length of which is determined by the necessity, on the one hand, of obtaining a maximum contrast between the absorption due to the sulphur and that due to the other elements, and, on the other hand, of rendering negligible the effect of the liquid phase, and for this purpose the maximum gas density compatible with the obtaining of a reasonable information level is utilised.

Thus one is induced to adopt a relatively hard radiation: By way of example the analysis of certain natural gases is advantageously effected with the K$\alpha$Mo line.

If in the course of test it is necessary to effect a recalibration, it is not necessary that the frame 7 be removed and coupled to the test collar; it is sufficient to provide a by-pass of the collar 1. In order to effect the operation of recalibration, the collar is emptied and then standard pellets are introduced into the path traversed by the X-rays. In the apparatus represented diagrammatically in FIGURE 1, the introduction of the standard pellets is effected through the aperture 12. This aperture is of course closed when the sulphurimeter is in normal operation.

In FIGURE 2 there will be seen three particular features relating to the tubular member 2. Firstly, the end adjacent the gas outlet aperture of the collar 1 overlaps the internal wall of the collar 1. Secondly, the nut 4 possesses circular grooves and finally the beryllium pellet 3 is disposed within the tubular member 2 in such manner that its outer surface is flush with the end of the nut 4. These arrangements are made because the gas passing through the collar may be in a slightly diphasic form. If this is the case, it is necessary to prevent the liquid phase, which has a tendency to concentrate on the internal wall of the collar, from closing off the outer face of the pellet 3 and thus falsifying the result of the measurement.

It is seen that the X-ray sulphurimeter forming the subject of the present invention permits continuous determination, in the actual exploitation line, of the sulphur contained in the crude gas extracted under normal conditions of exploitation, that is to say for large flows, high pressures and quite high temperatures, it being possible for the gas to be slightly diphasic.

I claim:

1. An X-ray sulphurimeter for the determination of the sulphur content of crude gas containing liquid phase and issuing at high pressure in the neighborhood of 1000 kg./cm.$^2$, and at relatively high temperature in the neighborhood of 150° C., from a well exploitation line, comprising: a collar arranged to be located between two normal flanges of the well exploitation line and having a gas outlet aperture formed therein corresponding in size and configuration to the passage in said well line and to be aligned therewith, a pair of tubular members each having an axial bore extending completely therethrough and passing through said collar in gas-tight fashion and disposed on a common axis perpendicular to the axis of said aperture and on either side thereof, each of said tubular members at the end adjacent the gas outlet aperture of the collar being obturated by a beryllium pellet, with said ends of the tubular members overlapping the internal wall of the collar, the other end of each tubular member being formed with a lateral trued positioning bearing surface, and said collar being provided with a U-shaped frame having an X-ray tube mounted on one of the limbs thereof and a collimation assembly, a monochromator crystal and a radiation counter mounted on the other limb thereof, said frame having two machined bearing surfaces arranged to cooperate respectively with the two trued bearing surfaces of the tubular members such that when the collar and frame are arranged in assembled relationship, the X-ray source, the two tubular members and the collimation assembly are disposed on a common axis.

2. An X-ray sulphurimeter for the determination of the sulphur content of crude gas containing liquid phase and issuing at high pressure in the neighborhood of 1000 kg./cm.$^2$, and at relatively high temperature in the neighborhood of 150° C., from a well exploitation line including a collar to be located between two normal flanges of the well exploitation line and having a gas outlet aperture formed therein corresponding in size and configuration to the passage in said well line and to be aligned therewith, a pair of tubular members each having an axial bore extending completely therethrough and passing through said collar in gas-tight fashion and disposed on a common axis perpendicular to the axis of said aperture and on either side thereof, each of said tubular members at the end adjacent the gas outlet aperture of the collar being obturated by a beryllium pellet locked in position with the respective tubular member by locking means secured to the ends of the tubular members and possessing grooves on its exterior circumference which extend perpendicular to the axis of said tubular members, said ends overlapping the internal wall of the collar, the other end of each tubular member being formed with a lateral trued positioning bearing surface, and said collar being provided with a U-shaped frame having an X-ray tube mounted on one of the limbs thereof and a collimation assembly, a monochromator crystal and a radiation counter mounted on the other limb thereof, said frame having two machined bearing surfaces arranged to cooperate respectively with the two trued bearing surfaces of the tubular members such that when the collar and frame are arranged in assembled relationship, the X-ray source, the two tubular members and the collimation assembly are disposed on a common axis.

3. An X-ray sulphurimeter for the determination of the sulphur content of crude gas containing liquid phase and issuing at high pressure in the neighborhood of 1000 kgs./cm.$^2$, and at relatively high temperature in the neighborhood of 150° C., from a well exploitation line including a collar to be located between two normal flanges of the well exploitation line and having a gas outlet aperture formed therein corresponding in size and configuration to the passage in said well line and to be aligned therewith, a pair of tubular members each having an axial bore extending completely therethrough and passing through said collar in gas-tight fashion and disposed on a common axis perpendicular to the axis of the aperture and on either side thereof, each of said tubular members at the end adjacent the gas outlet aperture of the collar overlapping the internal wall of said collar and being obturated by a beryllium pellet, locked in position within the respective tubular member by locking means screwed to said ends of the tubular members, the external surfaces of the pellets lying flush with the ends of the locking means and the other end of each tubular member being formed with a lateral trued positioning bearing surface, and said collar being provided with a U-shaped frame having an X-ray tube mounted on one of the limbs thereof and a collimation assembly, a monochromator crystal and a radiation counter mounted on the other limb thereof, said frame having two machined bearing surfaces arranged to cooperate respectively with the two trued bearing surfaces of the tubular members such that when the collar and frame are arranged in assembled relationship, the X-ray source, the two tubular members and the collimation assembly are disposed on a common axis.

References Cited by the Examiner

UNITED STATES PATENTS

| | | | |
|---|---|---|---|
| 2,452,122 | 10/48 | Gumaer | 250—43.5 |
| 2,792,501 | 5/57 | Barton | 250—43.5 |
| 3,005,098 | 10/61 | Buschmann et al. | 250—51.5 |
| 3,005,099 | 10/61 | Fournier et al. | 250—51.5 |
| 3,029,341 | 4/62 | Keeling | 250—51.5 |

FOREIGN PATENTS 1,229,570  9/60  France.

RALPH G. NILSON, *Primary Examiner.*